United States Patent
Santosuosso

[15] 3,683,543
[45] Aug. 15, 1972

[54] FISHING LURE

[72] Inventor: Robert C. Santosuosso, 42 Sterling St., Malden, Mass. 02148

[22] Filed: July 13, 1970

[21] Appl. No.: 54,379

[52] U.S. Cl. .............. 43/42.09, 43/42.34, 43/42.39, 43/43.14
[51] Int. Cl. ........................................... A01k 85/00
[58] Field of Search ........................ 43/42.09, 42.39

[56] References Cited

UNITED STATES PATENTS

| 3,395,480 | 8/1968 | McPherson | 43/42.09 |
| 3,015,904 | 1/1962 | Trani | 43/42.09 |

FOREIGN PATENTS OR APPLICATIONS

| 709,269 | 5/1954 | Great Britain | 43/42.09 |

*Primary Examiner*—Samuel Koren
*Assistant Examiner*—Daniel J. Leach
*Attorney*—Morse, Altman & Oates

[57] ABSTRACT

An artificial fishing lure having an elongated body is provided with a weighted keel at its lower leading portion and a hook at its upper trailing portion. The keel is flat with a rounded lower edge and serves to maintain the lure in an upright position while at the same time causing a side-to-side motion of the lure when pulled through the water. The rounded configuration of the lower edge along with the location of the hook on the upper surface of the lure inhibits the lure from snagging on weeds. The body portion is contoured to provide an up-and-down undulating motion of the lure as it moves through the water.

4 Claims, 5 Drawing Figures

INVENTOR.
ROBERT C. SANTOSUOSSO
BY
Morse, Altman & Oates

ATTORNEYS

3,683,543

FISHING LURE

BACKGROUND OF THE INVENTION

1. Field of the Invention

This invention relates generally to fishing lures and more particularly is directed towards a new and improved artificial lure of simple, durable construction characterized by life-like motions when drawn through the water.

2. Description of the Prior Art

Artificial fishing lures have been the subject of considerable work and development for many years. Anglers prefer lures that not only are attractive to the fish but also have other desirable characteristics such as durability, ruggedness, ease of use and of a construction that does not readily snag on weeds. Also, most fishermen make it a practice to have on hand plugs in a variety of weights so that the casting range may be modified according to conditions.

Heretofore, artificial fishing lures have not satisfactorily met all of the foregoing criteria and it is an object of the present invention to provide a fishing plug which not only displays life-like characteristics but also is of a durable, rugged and weedless construction. It is a further object of this invention to provide a fishing lure having a replaceable weighted keel whereby the plug weight may be modified by exchanging keels of different weights.

SUMMARY OF THE INVENTION

This invention features an artificial fishing lure comprising an elongated contoured body portion, an upright hook partically imbedded in the upper trailing portion of the body and a downwardly extending flattened keel detachably connected to the lower leading portion of the body, the keel serving to maintain the lure in an upright position with the hook raised to prevent snagging in weeds and at the same time imparting a side-to-side motion to the lure as it is drawn through the water. The body is configured to produce an up-and-down motion as the lure is moved.

DETAILED DESCRIPTION OF THE PREFERRED EMBODIMENT

Figure 1:
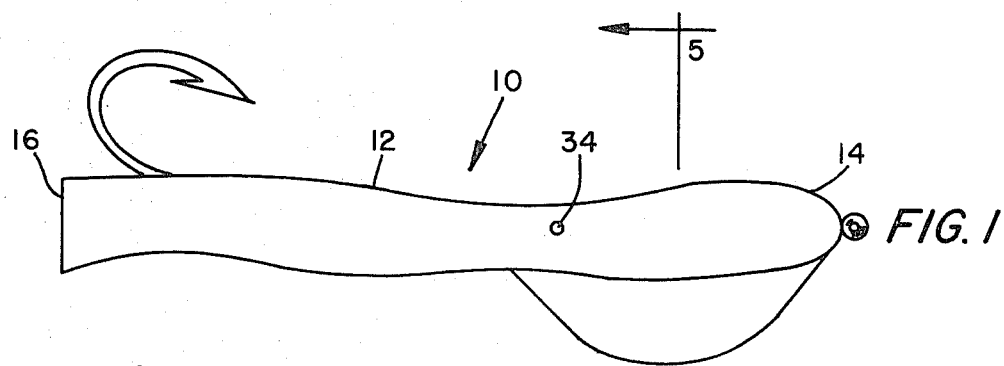
FIG. 1 is a view in side elevation of a fishing lure made according to the invention.
Figure 2:
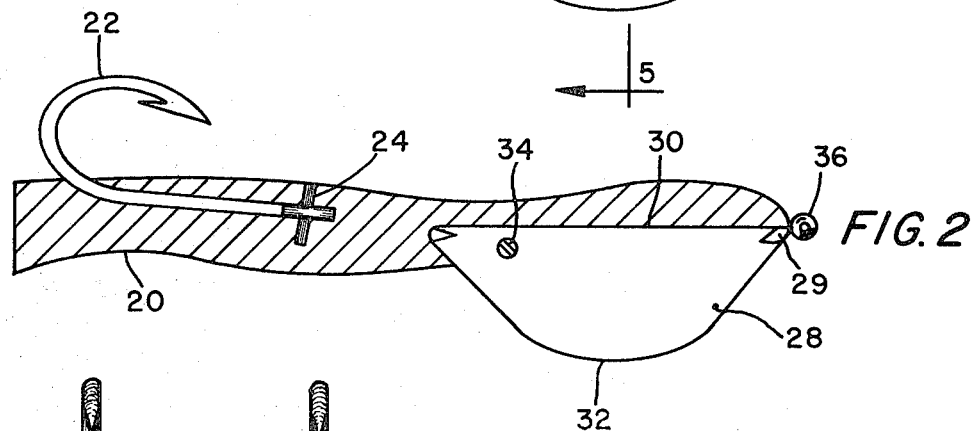
FIG. 2 is a sectional view in side elevation thereof.
Figure 4:
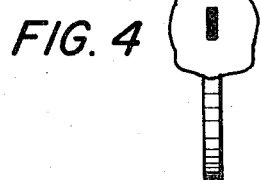
FIG. 4 is a view in front elevation, and, FIG. 5 is a cross-sectional view taken along the line 5—5 of FIG. 1.
Figure 5:
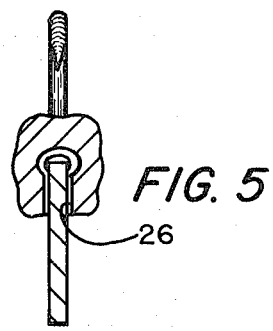
Figure 3:
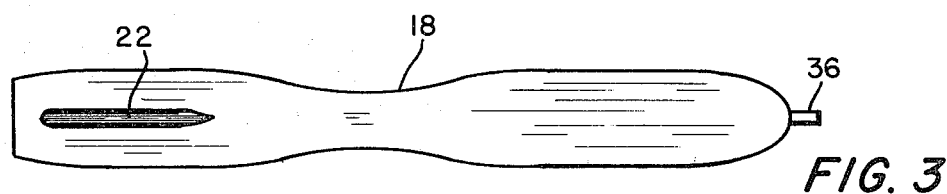
FIG. 3 is a top plan view thereof.

Referring now to the drawings, the reference character 10 generally indicates a fishing plug organized about an elongated contoured body 12 formed from a rugged, durable wood such as walnut or molded from plastic, for example. The body 12 is formed with a rounded head portion 14 connected to a tail portion 16 through a reduced mid-section 18. The tail portion 16 is formed with a curved lower face 20 which imparts an undulating vertical motion to the plug as it is drawn horizontally through the water.

The tail portion 16 also carries an upright hook 22 with the barb extending forwardly and the shank portion imbedded in the body 12. The hook is secured in position by means of a pin 24 passing through the eye of the hook and imbedded in the body 12 near the midsection. Various size hooks may be employed depending upon the type of fish that is sought.

The lower face of the head portion 14 is grooved at 26 from the tip back into the mid-section to receive the upper portion of a weighted keel 28 detachably mounted therein. The upper portion of the groove is enlarged as by drilling to receive bosses 29 formed in the upper ends of the keel. The keel 28, typically formed of lead or other heavy material, is characterized by a flat configuration with a generally straight upper edge 30 and a curved lower edge 32. The keel 28 is detachably secured to the plug body by means of a screw 34 passing through the body 12 and an opening formed in the keel near its upper trailing portion. The screw not only mounts the keel in position but also serves to anchor the keel against the pull of a line secured to an eye 36 attached to the forward end of the keel. The keel 28 may be readily changed by merely removing the screw 34 and sliding the keel out of the groove to replace it with another of a different weight.

The keel will be seen to be relatively large and extending for some distance from the lower face of the plug body and serves a number of functions. First of all, the keel maintains the plug in an upright position with the hook 22 held raised in the manner illustrated to prevent it becoming snagged on weeds, for example. Secondly, the rounded configuration of the keel helps the plug to ride over the rocks or other obstructions which the plug may encounter while being drawn through the water. Thirdly, the relatively large, flat surface provided by the keel induces a side-to-side undulation of the lure as it is drawn through the water.

The plug may be made in a variety of colors and reflective particles may be added to simulate the appearance of fish scales. If desired, a separate eye may be secured to the body perhaps 1 inch back from the tip to introduce more play into the action of the lure than is the case where the eye is attached directly to the keel. Also, an O-ring may be added to the eye for ease of attachment to a leader. In one embodiment, the plug 10 is fabricated in a length of 6 inches with a 7/0 Sobey needle nose hook employed. Obviously, other hooks of different sizes and configurations may be employed and the dimensions of the plug may also be modified according to the type of fish being sought. In practice, a keel weight of 1 oz. and a plug weight of 2 ozs. work satisfactorily although, here again, the weights may be changed as desired. By adding a keel having a greater weight, the casting range may be increased without separate weights.

Having thus described the invention what I claim and desire to obtain by Letters Patent of the United States is:

1. A fishing lure, comprising
   a. a lure body,
   b. a hook mounted to the upper portion of said body, and,
   c. a flat weighted keel mounted to the lower portion of said body,
   d. said keel being semi-circular in outline with the straight edge thereof engaging said body and the arcuate edge thereof extending away from said body, e. said keel being formed with enlargements along its straight edge and said body is formed with a groove having an enlarged base to receive said enlargements.

2. A fishing lure according to claim 1 wherein said keel is detachably mounted to said body.

3. A fishing lure according to claim 1 including a ring connected to the leading end of said keel.

4. A fishing lure according to claim 1 wherein said keel and body are formed with aligned openings and a removable locking member extends through said openings to lock said keel to said body.

* * * * *